(12) United States Patent
Nakano et al.

(10) Patent No.: US 6,300,010 B1
(45) Date of Patent: Oct. 9, 2001

(54) HYDROGEN ABSORBING ALLOY POWDER FOR USE IN THE NEGATIVE ELECTRODES OF ALKALINE RECHARGEABLE BATTERIES AND PROCESS FOR PRODUCING THE SAME

(75) Inventors: Hajime Nakano; Noriaki Hamaya; Satoshi Shima, all of Fukui-ken (JP)

(73) Assignee: Shin-Etsu Chemical Co, Inc., Tokyo (JP)

( * ) Notice: Subject to any disclaimer, the term of this patent is extended or adjusted under 35 U.S.C. 154(b) by 0 days.

(21) Appl. No.: 09/626,587

(22) Filed: Jul. 27, 2000

(30) Foreign Application Priority Data

Jul. 30, 1999 (JP) .................................................. 11-216873
Sep. 8, 1999 (JP) .................................................. 11-254368

(51) Int. Cl.$^7$ ..................................................... H01M 4/38
(52) U.S. Cl. .................................... 429/218.2; 429/218.1; 420/900
(58) Field of Search .............................. 429/218.1, 28.1, 429/218.2; 420/900

(56) References Cited

U.S. PATENT DOCUMENTS 5,864,072 * 1/1999 Kobayashi et al. ..................... 75/246
6,063,524 * 5/2000 Kasashima et al. ............... 429/218.2

FOREIGN PATENT DOCUMENTS

| 02306541 A | 12/1990 | (JP) | ................................ H01M/4/26 |
| 03116655 A | 5/1991 | (JP) | ................................ H01M/4/24 |
| 04292860 A | 10/1992 | (JP) | ................................ H01M/4/38 |
| 06044965 A | 2/1994 | (JP) | ................................ H01M/4/26 |
| 08213005 A | 8/1996 | (JP) | ................................ H01M/4/26 |

* cited by examiner

Primary Examiner—Stephen Kalaput
Assistant Examiner—M. Wills
(74) Attorney, Agent, or Firm—Myers Bigel Sibley & Sajovec

(57) ABSTRACT

An object of the present invention is to provide a hydrogen absorbing alloy powder for use in the negative electrodes of alkaline rechargeable batteries which has excellent initial characteristics and a high rate discharge property, exhibits satisfactory life characteristics, and is hence very beneficial from a practical point of view, as well as a process for producing the same. Specifically, the present invention provides a hydrogen absorbing alloy powder for use in the negative electrodes of alkaline rechargeable batteries which has an average particle diameter of 5 to 20 $\mu$m and an oxygen content of 2,000 to 6,000 ppm and, moreover, wherein the oxygen on the surfaces of hydrogen absorbing alloy particles is present in the form of hydroxyl groups.

10 Claims, 3 Drawing Sheets

HYDROGEN ABSORBING ALLOY POWDER FOR USE IN THE NEGATIVE ELECTRODES OF ALKALINE RECHARGEABLE BATTERIES AND PROCESS FOR PRODUCING THE SAME

BACKGROUND OF THE INVENTION

1. Field of the Invention

This invention relates to hydrogen absorbing alloy powders for use in the negative electrodes of alkaline rechargeable (secondary) batteries and processes for producing the same.

2. Description of the Related Art

For purposes associated with performance improvements including, for example, a reduction in the size and weight of electronic information equipment, a reduction in the size and an increase in the power output of electric tools, and a reduction in the size and weight of electric cars, it is desired to reduce the size and weight of rechargeable batteries used therefor and improve the performance thereof. As a result, it has become essential to improve the performance characteristics of rechargeable batteries, such as initial activity, a high rate discharge property and life characteristics.

However, in rechargeable batteries used for these purposes and, in particular, increasingly widely used nickel-metal hydride alkaline rechargeable batteries, their initial activity and a high rate discharge property and their life characteristics run counter to each other owing to the properties of the hydrogen absorbing alloy used as the negative electrode active material constituting the batteries. In order to make them consistent with each other, various attempts have been made from the viewpoint of alloy composition and alloy preparation, but no satisfactory result has been obtained.

As a means for improving the initial characteristics and a high rate discharge property of nickel-metal hydride alkaline rechargeable batteries, it is conceivable to reduce the hydrogen absorbing alloy powder constituting the negative electrode. To this end, various investigations on the particle size or particle diameter of the hydrogen absorbing alloy powder are made, for example, in Japanese Patent Provisional Publication Nos. 2-306541, 3-116655 and 4-292860. Although it is described therein to reduce the particle size or particle diameter, these techniques are less than practicable from the viewpoint of battery characteristics, production process, and handling of hydrogen absorbing alloys.

As to the addition of an electrically conductive material to the negative electrode of a nickel-metal hydride alkaline rechargeable battery, it is common practice to add the electrically conductive material, together with a binder and a thickener, during the preparation of a paste. Processes in which an electrically conductive material is mixed with an alloy powder are proposed in Japanese Patent Provisional Publication Nos. 6-44965 and 8-213005. However, since the alloy powder has a large particle size and is ground in a solvent system, these techniques are less than practicably from the viewpoint of battery characteristics and production process.

SUMMARY OF THE INVENTION

In view of the above-described problems, the present inventors made intensive investigations with a view to developing a hydrogen absorbing alloy powder for use in the negative electrodes of alkaline rechargeable batteries which has excellent initial characteristics and a high rate discharge property, exhibits satisfactory life characteristics, and is hence very beneficial from a practical point of view.

As a result, the present inventors have now found that the above-described problems can be solved by reducing the particle size of the alloy powder to increase the reaction area, reducing the oxygen content as compared with the surface area, and causing the oxygen to be present in the form of hydroxyl groups.

In order to accomplish the above object, the present invention provides a hydrogen absorbing alloy powder for use in the negative electrodes of alkaline rechargeable batteries which is characterized in that it has an average particle diameter of 5 to 20 $\mu$m and an oxygen content of 2,000 to 6,000 ppm, and in that the oxygen on the surfaces of hydrogen absorbing alloy particles is present in the form of hydroxyl groups.

Thus, the particle size of the powder is so small as to increase the reaction area, the oxygen content is low as compared with the surface area, and the oxygen is present in the form of hydroxyl groups. Consequently, the charging and discharging reactions proceed rapidly and the corrosion of the surface can be suppressed, so that the alloy powder has excellent initial characteristics and a high rate discharge property and can exhibit satisfactory life characteristics.

In another aspect, the present invention provides a process for the production of a hydrogen absorbing alloy powder for use in the negative electrodes of alkaline rechargeable batteries which comprises the steps of grinding a hydrogen absorbing alloy in an inert gas and, prior to exposure to ambient air, treating the resulting hydrogen absorbing alloy powder with an inert gas containing a very small amount of moisture.

In another embodiment, the process for the production of a hydrogen absorbing alloy powder for use in the negative electrodes of alkaline rechargeable batteries in accordance with the present invention may comprise the step of grinding a hydrogen absorbing alloy in an atmosphere of an inert gas containing a very small amount of moisture.

Furthermore, according to the present invention, the hydrogen absorbing alloy powder is mixed with an electrically conductive material during its grinding in an atmosphere of an inert gas. Consequently, the electrically conductive material adheres to the surfaces of hydrogen absorbing alloy particles owing to the surface energy of the surfaces newly formed by grinding, so that the electrically conductive material is uniformly dispersed without cohering together.

Thus, the present invention can provide a hydrogen absorbing alloy powder for use in the negative electrodes of alkaline rechargeable batteries which has excellent initial characteristics and a high rate discharge property, exhibits satisfactory life characteristics, and is hence very beneficial from a practical point of view.

DETAILED DESCRIPTION OF THE PREFERRED EMBODIMENTS

Figure 1:
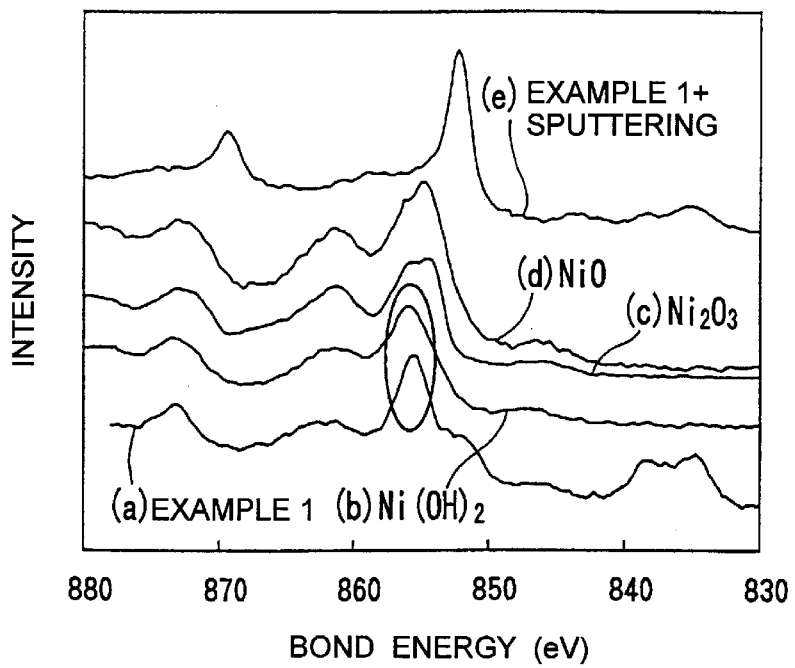
FIG. 1 is a diagram showing the state of oxygen combined with Ni in the neighborhood of the surfaces of the alloy obtained in Example 1 as analyzed by X-ray photoelectron spectroscopy, and including various curves for (a) the alloy powder obtained in Example 1, (b) the compound $Ni(OH)_2$, (C) the compound $Ni_2O_3$, (d) NiO, and (e) an alloy obtained by scraping off the surfaces of the alloy of Example 1 with an $Ar^+$beam.

With respect to hydrogen absorbing alloy powders for use in the negative electrodes of alkaline rechargeable batteries in accordance with the present invention, and the processes for producing the same, embodiments of the present invention will be specifically described hereinbelow.

First of all, the hydrogen absorbing alloy used in the present invention is described in detail.

No particular limitation is placed on the composition of the hydrogen absorbing alloy used in the present invention, and there may be used any intermetallic compound of the formula $A_xB_y$ wherein x and y are each a positive integer of 1 to 17. The A-side elements include, for example, rare earth elements (e.g., La), Ti, V and Zr. The B-side elements include, for example, Ni, Fe, Co, Mn and Al.

In the practice of the present invention, various elements are weighed out so as to give a predetermined alloy composition, melted according to a technique such as high-frequency induction melting, arc melting or electron beam melting, and then cast. The solidified alloy may be in the form of a cast ingot, a ribbon formed by rapid roll quenching, or spherical particles formed by atomization. The atmosphere for melting may be an inert atmosphere of Ar or the like, though it may depend on the alloy composition.

The hydrogen absorbing alloy thus obtained may be heat-treated, if necessary. It is desirable that this heat treatment is carried out in an inert atmosphere of Ar or the like.

Then, the resulting hydrogen absorbing alloy is coarsely ground to an average particle diameter of several millimeters or less by means of a jaw crusher, roll mill, Brown mill or the like. In order to reduce the oxygen content of the resulting alloy powder, this coarse grinding is preferably carried out in an inert atmosphere of Ar, nitrogen or the like.

Next, this coarsely ground hydrogen absorbing alloy powder is pulverized to an average particle diameter in the range of 5 to 20 μm. If the average particle diameter of the hydrogen absorbing alloy powder is less than 5 μm, the surface area may become so large as to cause corrosion to proceed rapidly, resulting in an undesirable reduction in cycle characteristics. On the other hand, if the average particle diameter is greater than 20 μm, the high rate discharge property constituting one feature of the present invention may undesirably be reduced. Preferably, the average particle diameter of the aforesaid hydrogen absorbing alloy powder is in the range of 5 to 15 μm, and more preferably in the range of 5–10 μm.

According to another embodiment of the present invention, the coarsely ground hydrogen absorbing alloy powder is mixed with an electrically conductive material by means of a blender or the like, and then pulverized to an average particle diameter of not greater than 20 μm, preferably 5 to 15 μm, and more preferably 5 to 10 μm. Alternatively, the electrically conductive material may be added during coarse grinding.

As the electrically conductive material, there may be used metallic nickel, cobalt and copper, compounds of the foregoing metals (e.g., cobalt monoxide), and carbon. The aforesaid compounds may be compound oxides of the foregoing metals.

The electrically conductive material is preferably added in an amount of 0.01 to 20% by weight based on the hydrogen absorbing alloy. If the amount of the electrically conductive material is less than 0.01% by weight, the effect of its addition may be very little. If it is greater than 20% by weight, the resulting electrode may show a significant reduction in electric capacity and may not be suitable for practical purposes.

The particle diameter of the electrically conductive material added may be arbitrarily chosen and may be regulated by grinding. However, it is preferable to use an electrically conductive material having a particle diameter of not greater than 500 μm.

The electrically conductive material may be added before coarse grinding, after coarse grinding and before pulverization, or during pulverization. Accordingly, the average particle diameter of the electrically conductive material depends on the time of its addition. For example, the average particle diameter may be not less than 1 mm where the electrically conductive material is added before coarse grinding, and the average particle diameter may be in the range of about 1 to 10 μm where the electrically conductive material is added during pulverization. It is preferable that, after pulverization, the electrically conductive material finally have an average particle diameter of 1 to 10 μm. Within this range, the electrically conductive material can be uniformly dispersed in the hydrogen absorbing alloy to improve its electrical conductivity effectively.

In the case of dry grinding, the pulverization may be carried out by means of a pin mill, jet mill or the like. In order to obtain a hydrogen absorbing alloy powder having the desired average particle diameter and oxygen content, impact type dry grinding with a jet mill is especially preferred.

In this impact type dry grinding, the coarsely ground hydrogen absorbing alloy powder is mixed with a predetermined amount of the electrically conductive material, and the resulting mixture is pulverized in an atmosphere of an inert gas such as nitrogen or argon.

Subsequently, and prior to exposure to ambient air, the finely ground hydrogen absorbing alloy powder is stabilized in an atmosphere of an inert gas containing a very small amount (specifically, not greater than 2,000 ppm) of moisture. By modifying the surfaces newly formed during grinding, the oxygen content of the hydrogen absorbing alloy powder having a small particle diameter can further be reduced to a level in the range of 2,000 to 6,000 ppm. Preferably, the oxygen content is in the range of 2,000 to 4,000 ppm. If the oxygen content of the hydrogen absorbing alloy powder is less than 2,000 ppm, the surface activity may be undesirably high and hence involve a great risk of combustion. On the other hand, if the oxygen content is greater than 6,000 ppm, the resulting electrode may undesirably show a reduction in initial characteristics and electric capacity.

An oxygen content within the above-described range can be achieved by controlling the oxygen and moisture contents of the inert gas used in the pulverization step so as to fall within their optimum ranges.

Moreover, the modification of the surfaces newly formed during grinding causes the oxygen on the alloy surfaces to be present in the form of hydroxyl groups. If the aforesaid oxygen is present in other forms than hydroxyl groups, this is undesirable because a thin oxide film may be formed on the alloy surfaces to hinder the absorption and desorption of hydrogen.

The oxygen on the alloy surfaces are either adsorbed on the alloy surfaces or combined with the constituent elements of the alloy on the alloy surfaces, and is present in the form of oxides or hydroxides.

Even when the hydrogen absorbing alloy powder contains an electrically conductive material during grinding, the modification of the newly formed surfaces including regions having the electrically conductive material attached thereto can cause the oxygen on the alloy surfaces to be present in the form of hydroxyl groups.

Accordingly, when the hydrogen absorbing alloy powder is mixed with an electrically conductive material during grinding as described above, the dispersibility of the electrically conductive material among alloy particles is enhanced, and the surfaces to which the electrically conductive material is attached bring about an improvement especially in the high rate discharge property of the resulting batteries.

In addition to the above-described processes, the surfaces newly formed during grinding may also be modified by impact type dry grinding in which the hydrogen absorbing alloy powder is pulverized in an inert gas containing a very small amount of moisture (specifically, in an inert gas containing 2,000 ppm of moisture). The introduction of a very small amount of moisture can be carried out, for example, by mixing some air with the grinding atmosphere.

On the other hand, friction type dry grinding with a Brown mill or the like may not be effective in preparing a hydrogen absorbing alloy powder having a small average particle diameter as defined in the present invention. Thus, this technique may not be suitable for practical purposes owing to the problems with heat evolution and ground surface clearance.

Furthermore, wet grinding with a ball mill or attritor permits a hydrogen absorbing alloy powder having an average particle diameter as defined by the present invention to be relatively easily prepared. However, if water is used as the grinding medium, the oxygen content of the hydrogen absorbing alloy cannot be reduced to a level within the range defined in the present invention. It is possible to reduce the oxygen content of the ground hydrogen absorbing alloy powder by using an organic solvent (e.g., toluene) as the grinding medium. However, with consideration for the viewpoint of the recovery and safety of the organic solvent, this process cannot readily be employed for industrial purposes.

As described above, the hydrogen absorbing alloy powder of the present invention is characterized in that it has a small average particle diameter in the range of 5 to 20 $\mu$m and a low oxygen content in the range of 2,000 to 6,000 ppm, and in that the oxygen on the alloy surfaces is present in the form of hydroxyl groups. Consequently, when this hydrogen absorbing alloy powder is used as an active material for the negative electrodes of alkaline rechargeable batteries, the charging and discharging reactions proceed rapidly and the corrosion of the surface can be suppressed, so that the alloy powder has excellent initial characteristics and a high rate discharge property and exhibits good life characteristics.

No particular limitation is placed on the type of the binder used to form electrodes from the hydrogen absorbing alloy powder of the present invention. The binder may be suitably selected from among organic binders including polyvinyl alcohol, cellulose derivatives (e.g., methylcellulose and carboxymethylcellulose), PTFE, polyethylene oxide, high-polymer latices and the like. These binders may be used alone or in admixture of two or more. The binder is used in an amount of 0.1 to 20% by weight based on the allow powder.

No particular limitation is placed on the type of the electrically conducting support into which a mixture of the alloy powder and the binder is filled in the practice of the present invention. The electrically conducting support may be suitably selected from among electrically conducting three-dimensional supports (e.g., fibrous nickel and foamed nickel), electrically conducting two-dimensional supports (e.g., punching metal) and the like.

Also, the hydrogen absorbing alloy powder of the present may be formed using a mold into a compact for a negative electrode.

Accordingly, the hydrogen absorbing alloy electrodes of the present invention may be made, for example, by adding the hydrogen absorbing alloy powder of the present invention to an aqueous solution containing a binder as described above, kneading this mixture into a paste, applying this paste to a surface of an electrically conducting support, drying the paste, and pressing the resulting assembly. Alternatively, they may be made by forming a sheet from the aforesaid paste and bonding this sheet to a surface of an electrically conducting support under pressure. Thus, the negative electrode according to the present invention can be a part of an alkaline rechargeable battery together with an Ni positive electrode, an electrolyte solution and a separator.

The present invention is further illustrated by the following examples. However, these examples are not to be construed to limit the scope of the invention.

Preparation of Hydrogen Absorbing Alloy Powders

EXAMPLE 1

A hydrogen absorbing alloy ingot (consisting of a rare earth element mixture (composed of 63% by weight of La, 7% by weight of Ce, 22% by weight of Pr, and 8% by weight of Nd), Ni, Co, Mn and Al in atomic ratios of 1.0, 3.75, 0.75, 0.20 and 0.30, respectively) was made by means of a high-frequency melting furnace, and then heat-treated in argon to obtain a homogeneous hydrogen absorbing alloy ingot. First of all, this alloy ingot was crushed in an atmosphere of nitrogen.

Then, using a Brown mill, the crushed alloy was ground to an average particle diameter of not greater than 1 mm. Thus, there was obtained a coarsely ground hydrogen absorbing alloy powder. Moreover, this powder was pulverized in an atmosphere of nitrogen by means of an impact type pin mill, and the finely ground hydrogen absorbing alloy powder was recovered in a recovery vessel so as not to come into contact with ambient air. Thereafter, nitrogen containing 1,000 ppm of moisture was introduced into the recovery vessel. After the powder was treated in this manner for 10 hours, it was sieved through a screen having an opening of 20 $\mu$m to obtain a hydrogen absorbing alloy powder.

EXAMPLE 2

A coarsely ground hydrogen absorbing alloy powder was prepared in the same manner as in Example 1. Then, using a jet mill, this powder was dry-ground in an atmosphere of nitrogen gas having a gas pressure of 5.8 kgf/cm$^2$. The finely ground hydrogen absorbing alloy powder was recovered in a recovery vessel so as not to come into contact with ambient air. Thereafter, nitrogen containing 1,000 ppm of moisture was introduced into the recovery vessel. After the powder was treated in this manner for 10 hours, there was obtained a hydrogen absorbing alloy powder.

EXAMPLE 3

A coarsely ground hydrogen absorbing alloy powder was prepared in the same manner as in Example 1. Then, using a jet mill, this powder was pulverized in an atmosphere of nitrogen gas having a gas pressure of 5.8 kgf/cm$^2$. However, in order to introduce moisture into the atmosphere, air was added thereto in such an amount as to give an oxygen concentration of 0.5% by volume. The finely ground hydrogen absorbing alloy powder was recovered in a recovery vessel so as not to come into contact with ambient air. Thus, there was obtained a hydrogen absorbing alloy powder.

Comparative Example 1

A coarsely ground hydrogen absorbing alloy powder was prepared in the same manner as in Example 1, and pulverized in an atmosphere of nitrogen gas by means of an impact type pin mill. The finely ground hydrogen absorbing alloy powder was recovered in a recovery vessel so as not to come into contact with ambient air, and then sieved through a screen having an opening of 20 $\mu$m to obtain a hydrogen absorbing alloy powder.

Comparative Example 2

A coarsely ground hydrogen absorbing alloy powder was prepared in the same manner as in Example 1, and milled in a ball mill using water as the grinding medium. Thereafter, the milled powder was separated from the water and the balls by filtration, and dried in vacuo to obtain a hydrogen absorbing alloy powder.

Comparative Example 3

A coarsely ground hydrogen absorbing alloy powder was prepared in the same manner as in Example 1, and pulverized in an atmosphere of nitrogen by means of an impact type pin mill operated under altered conditions. The finely ground hydrogen absorbing alloy powder was recovered in a recovery vessel so as not to come into contact with ambient air, and then sieved through a screen having an opening of 75 $\mu$m to obtain a hydrogen absorbing alloy powder.

EXAMPLE 4

A coarsely ground hydrogen absorbing alloy powder was prepared in the same manner as in Example 1, mixed with an electrically conductive material, and pulverized. Specifically, an electrically conductive material comprising carbonylnickel (#255, manufactured by INCO; with an average particle diameter of 15 $\mu$m) was added to the coarsely ground powder in an amount of 5% by weight, and this mixture was blended in a conical blender having an atmosphere of nitrogen for 30 minutes. Then, using a jet mill, the resulting blend was dry-ground in an atmosphere of nitrogen gas having a gas pressure of 5.8 kgf/cm$^2$. The finely ground hydrogen absorbing alloy powder was recovered in a recovery vessel so as not to come into contact with ambient air. Thereafter, nitrogen containing 1,000 ppm of moisture was introduced into the recovery vessel. After the powder was treated in this manner for 10 hours, there was obtained a hydrogen absorbing alloy powder containing the electrically conductive material.

EXAMPLE 5

A coarsely ground hydrogen absorbing alloy powder containing an electrically conductive material was prepared in the same manner as in Example 1. Then, using a jet mill, this powder was pulverized in an atmosphere of nitrogen gas having a gas pressure of 5.8 kgf/cm$^2$ as described in Example 4. However, in order to introduce moisture into the atmosphere, air was added thereto in such an amount as to give an oxygen concentration of 0.5% by volume. The finely ground hydrogen absorbing alloy powder was recovered in a recovery vessel so as not to come into contact with ambient air. Thus; there was obtained a hydrogen absorbing alloy powder containing the electrically conductive material.

EXAMPLE 6

A hydrogen absorbing alloy powder containing an electrically conductive material was obtained in the same manner as in Example 4, except that 20% by weight of carbonylnickel (#255, manufactured by INCO) was added as the electrically conductive material.

EXAMPLE 7

A hydrogen absorbing alloy powder containing an electrically conductive material was obtained in the same manner as in Example 4, except that 2% by weight of Ketjen Black was added as the electrically conductive material.

EXAMPLE 8

A coarsely ground hydrogen absorbing alloy powder was prepared in the same manner as in Example 1. Then, using a jet mill, this powder was dry-ground in an atmosphere of nitrogen gas having a gas pressure of 5.8 kgf/cm$^2$. The finely ground hydrogen absorbing alloy powder was recovered in a recovery vessel so as not to come into contact with ambient air. Thereafter, nitrogen containing 1,000 ppm of moisture was introduced into the recovery vessel. The powder was treated in this manner for 10 hours to obtain a hydrogen absorbing alloy powder. The hydrogen absorbing alloy powder thus obtained was mixed with an electrically conductive material comprising 5% by weight of carbonylnickel (#255, manufactured by INCO), and this mixture was blended in a conical blender having an atmosphere of nitrogen for 30 minutes. Thus, there was obtained a hydrogen absorbing alloy powder containing the electrically conductive material.

Comparative Example 4

A coarsely ground hydrogen absorbing alloy powder was prepared in the same manner as in Example 1, and mixed with an electrically conductive material comprising 5% by weight of carbonylnickel (#255, manufactured by INCO). This mixture was milled in a ball mill using water as the grinding medium. Thereafter, the milled powder was separated from the water and the balls by filtration, and dried in vacuo to obtain a hydrogen absorbing alloy powder containing the electrically conductive material.

Comparative Example 5

A coarsely ground hydrogen absorbing alloy powder was prepared in the same manner as in Example 1, and pulverized in an atmosphere of nitrogen by means of an impact type pin mill operated under altered conditions. The finely ground hydrogen absorbing alloy powder was recovered in a recovery vessel so as not to come into contact with ambient air, and then sieved through a screen having an opening of 75 $\mu$m to obtain a hydrogen absorbing alloy powder. The hydrogen absorbing alloy powder thus obtained was mixed with an electrically conductive material comprising 5% by weight of carbonylnickel (#255, manufactured by INCO), and this mixture was blended in a conical blender having an atmosphere of nitrogen for 30 minutes. Thus, there was obtained a hydrogen absorbing alloy powder containing the electrically conductive material.

Measurement of Characteristic Values

With respect to each of the hydrogen absorbing alloy powders obtained in the foregoing Examples 1–8 and Comparative Examples 1–5, the particle size distribution, average particle diameter and oxygen concentration were measured. The measurement of particle size distribution and average particle diameter was made by laser diffractometry, and the measurement of oxygen concentration was made by inert gas melting infrared absorption spectrophotometry. The results thus obtained are shown in Table 1.

TABLE 1

|  | Average particle diameter (pm) | Oxygen content (ppm) |
| --- | --- | --- |
| Example 1 | 10.5 | 4,100 |
| Example 2 | 9.7 | 3,200 |
| Example 3 | 6.7 | 3,400 |
| Comparative Example 1 | 10.4 | 6,500 |
| Comparative Example 2 | 10.1 | 9,700 |
| Comparative Example 3 | 35.4 | 890 |
| Example 4 | 7 | 3,900 |
| Example 5 | 8 | 3,400 |
| Example 6 | 7 | 3,700 |
| Example 7 | 8 | 3,200 |
| Comparative Example 4 | 8 | 9,200 |
| Comparative Example 5 | 34 | 1,100 |

As shown in Table 1, it can be confirmed that the hydrogen absorbing alloy powders of Example 1–8 had an average particle diameter of 5 to 20 $\mu$m and an oxygen content of 2,000 to 6,000 ppm.

On the other hand, the hydrogen absorbing alloy powders of Comparative Example 1–2 could have an average particle diameter of 5 to 20 $\mu$m. In such cases, however, the oxygen content exceeded 6,000 ppm, depending on the grinding conditions and the treating conditions. Thus, it was impossible to produce a hydrogen absorbing alloy powder meeting all the requirements of the present invention.

Figure 2:
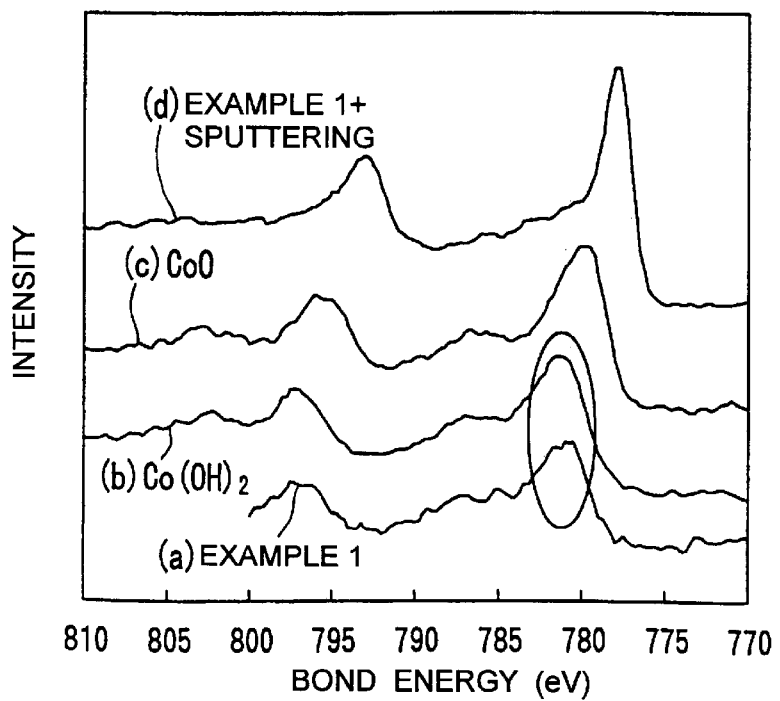
FIG. 2 is a diagram showing the state of oxygen combined with Co in the neighborhood of the surfaces of the alloy obtained in Example 1 as analyzed by X-ray photoelectron spectroscopy, and including various curves for (a) the alloy powder obtained in Example 1, (b) Co(OH)$_2$ (C) CoO, and (d) an alloy obtained by scraping off the surfaces of the alloy of Example 1 with an Ar$^+$beam.
Figure 3:
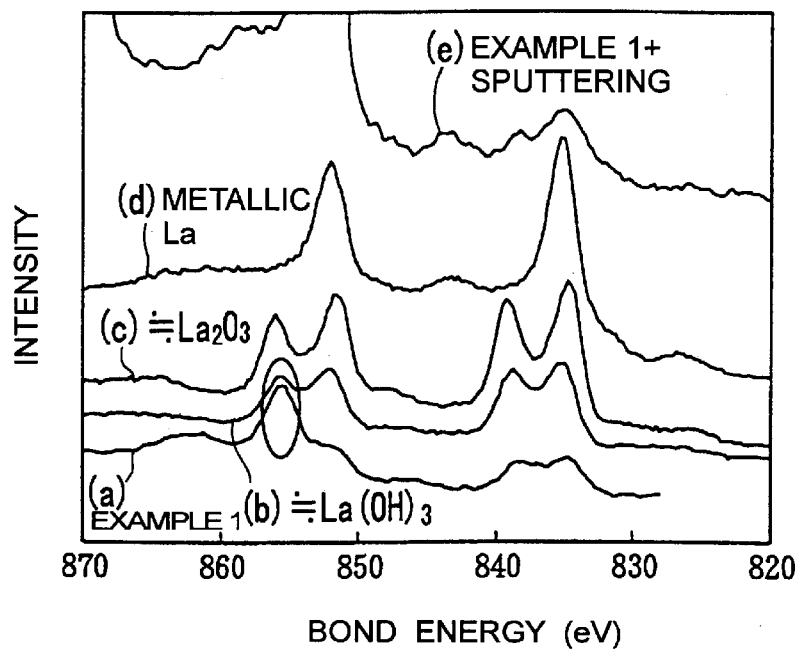
FIG. 3 is a diagram showing the state of oxygen combined with La in the neighborhood of the surfaces of the alloy obtained in Example 1 as analyzed by X-ray photoelectron spectroscopy, and including various curves for (a) the alloy obtained in Example 1, (b) La≈(OH)$_3$, (c) ≈La$_2$O$_3$, (d) metallic La, and (e) an alloy obtained by scraping off the surfaces of the alloy of Example 1 with an Ar$^+$beam.
Figure 4:
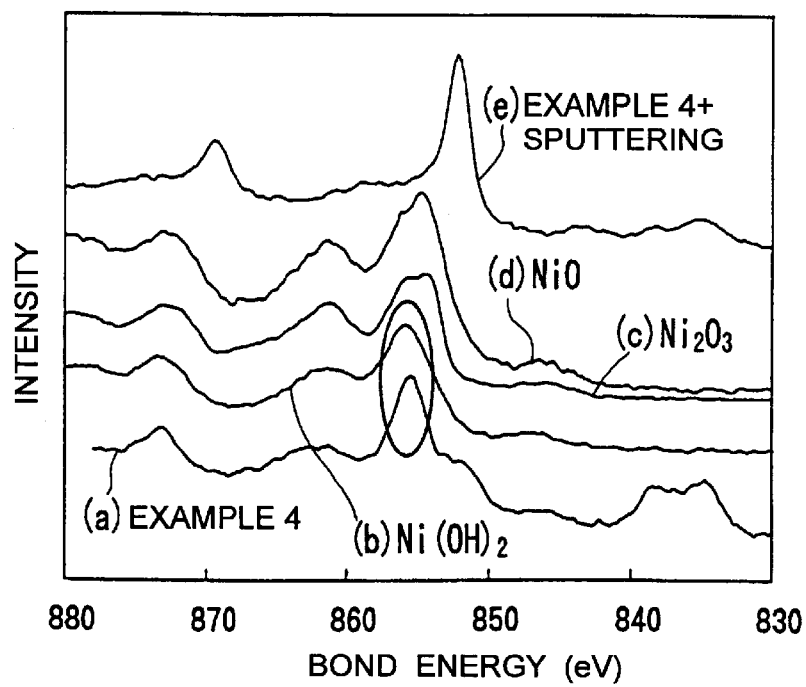
FIG. 4 is a diagram showing the state of oxygen combined with Ni in the neighborhood of the surfaces of the alloy obtained in Example 4 as analyzed by X-ray photoelectron spectroscopy, and including various curves for (a) the alloy powder obtained in Example 4, (b) the compound Ni(OH)$_2$, (C) the compound Ni$_2$O$_3$, (d) NiO, and (e) an alloy obtained by scraping off the surfaces of the alloy of Example 4 with an Ar$^+$beam.
Figure 5:
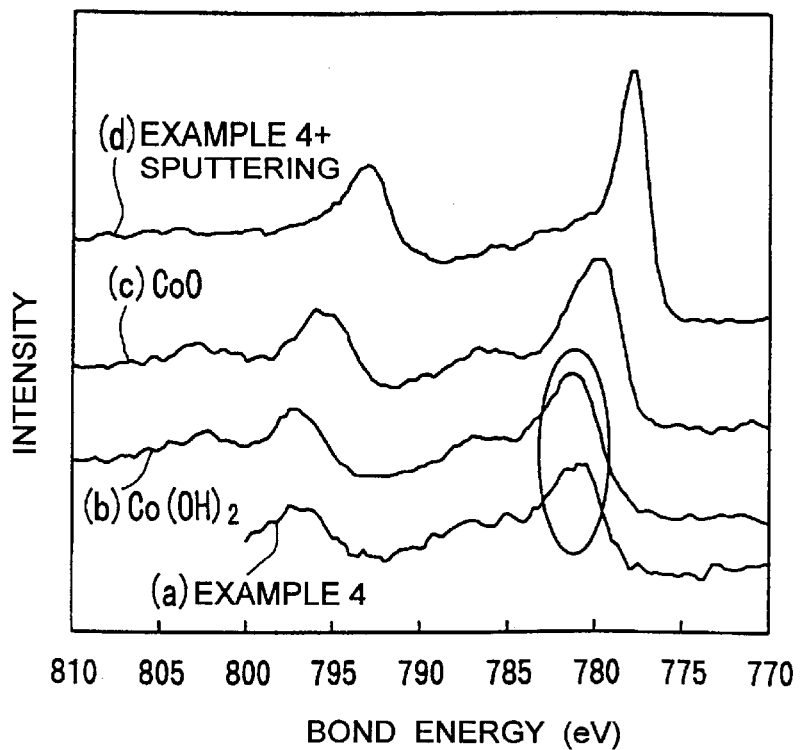
FIG. 5 is a diagram showing the state of oxygen combined with Co in the neighborhood of the surfaces of the alloy obtained in Example 4 as analyzed by X-ray photoelectron spectroscopy, and including various curves for (a) the alloy powder obtained in Example 4, (b) Co(OH)$_2$, (c) CoO, and (d) an alloy obtained by scraping off the surfaces of the alloy of Example 4 with an Ar$^+$beam.
Figure 6:
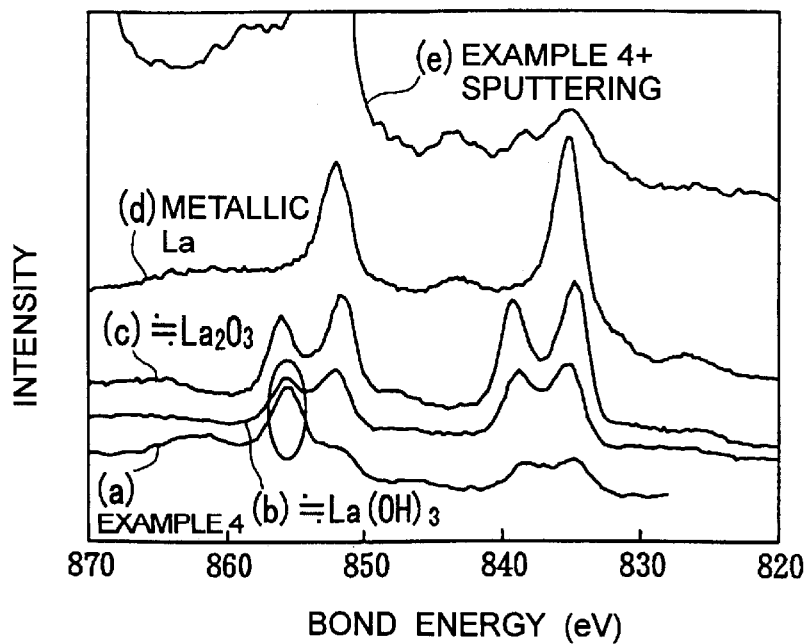
FIG. 6 is a diagram showing the state of oxygen combined with La in the neighborhood of the surfaces of the alloy obtained in Example 4 as analyzed by X-ray photoelectron spectroscopy, and including various curves for (a) the alloy obtained in Example 4, (b) ≈La(OH)$_3$, (c) ≈La$_2$O$_3$, (d) metallic La, and (e) an alloy obtained by scraping off the surfaces of the alloy of Example 1 with an Ar$^+$beam.

Moreover, in order to analyze the state of the oxygen present on the surfaces of some hydrogen absorbing alloys, the type of the combination of oxygen with Ni, Co and La that were principal compoments of the hydrogen absorbing alloy used in the examples and comparative examples was examined. The results thus obtained are shown in FIGS. 1–6.

FIGS. 1–6 are diagrams showing the state of oxygen combined with Ni, Co or La in the neighborhood of the surfaces of the alloys obtained in Examples 1 and 4 as analyzed by X-ray photoelectron spectroscopy. As shown in FIGS. 1–6, it can be confirmed from the values of bond energy and the shapes of peaks that most of the oxygen present in the neighborhood of the surface of the hydrogen absorbing alloy and combined with the principal components (i.e., Ni, Co and La) of the hydrogen absorbing alloy is in the form of hydroxyl groups. With respect to the alloys obtained Examples 2–3 and 5–6, it can be similarly confirmed that the oxygen is in the form of hydroxyl groups.

Tests with Open Type Batteries

The hydrogen absorbing alloy powder obtained in Example 1 was weighed out so as to give 1 g of the hydrogen absorbing alloy, and 0.25 g of a 3 wt % solution of PVA was added to and mixed with the alloy powder. Then, this fluid mixture was applied to a current-collecting fibrous nickel substrate having a nickel lead attached thereto by electric spot welding, and dried under reduced pressure. After the substrate was interposed between two layers of fibrous nickel, the resulting seembly was placed in a hydraulic press and pressed under a pressure of about 560 kgf/cm$^2$ for 1 minute to form an electrode (negative electrode).

The electrode so formed was wrapped with a polypropylene separator and then interposed between two electrodes (positive electrodes) made of nickel hydroxide. This electrode assembly, together with a Hg/HgO reference electrode, was placed in a vessel made of polypropylene, and an 8N aqueous solution of KOH was poured thereinto to construct an open type battery.

This battery was charged at 90 mA for 5 hours, rested for 30 minutes, discharged at 60 mA until the battery voltage reached 0.7 V relative to the mercury reference electrode (Hg/HgO), and rested for 10 minutes. By repeating this charge-discharge cycle, changes in discharge capacity were observed as a function of the number of cycles.

Moreover, a similar battery was constructed and subjected to three charge-discharge cycles under the above-described conditions. Thereafter, its high rate discharge property was evaluated at a discharge current of 1,500 mA.

The same tests as described above were also carried out with respect to the hydrogen absorbing alloy powders obtained in Examples 2–8 and Comparative Examples 1–5. The results thus obtained are shown in Table 2.

TABLE 2

|  | Initial characteristics, discharge capacity in cycle 1 (mAh/g) | Life characteristics, discharge capacity in cycle 200 (mAh/g) | High rate discharge property, discharge capacity at 1,500 mA (mAh/g) |
|---|---|---|---|
| Example 1 | 286 | 277 | 172 |
| Example 2 | 295 | 275 | 185 |
| Example 3 | 302 | 278 | 170 |
| Comparative Example 1 | 262 | 231 | 120 |
| Comparative Example 2 | 255 | 225 | 107 |
| Comparative Example 3 | 152 | 276 | 11 |
| Example 4 | 305 | 282 | 242 |
| Example 5 | 307 | 280 | 250 |
| Example 6 | 304 | 275 | 253 |
| Example 7 | 301 | 283 | 238 |
| Example 8 | 295 | 277 | 174 |
| Comparative Example 4 | 257 | 252 | 162 |
| Comparative Example 5 | 151 | 281 | 14 |

From the results of charging-discharging tests with open type batteries shown in Table 2, it can be seen that the batteries of Examples 1–3 of the present invention have more excellent initial characteristics because their discharge capacities in cycle 1 are higher as compared with Comparative Examples 1–3. Similarly, it can also be seen that the batteries of Examples 1–3 have a more excellent high rate discharge property because their discharge capacities at 1,500 mA are higher. On the other hand, the discharge capacities in cycle 200 of the batteries of Examples 1–3 are more excellent than those of the batteries of Comparative Examples 1 and 2 in which a hydrogen absorbing alloy powder having a similar average particle diameter was used, but are almost equal to that of the battery of Comparative Example 3 in which a hydrogen absorbing alloy powder having a larger average particle diameter of about 35 µm was used. Examples 4–7 indicate that an improvement in characteristics is achieved by mixing an electrically conductive material with the hydrogen absorbing alloy powder in the pulverization step.

In Comparative Example 4, an electrically conductive material was added during grinding similarly to Examples 4–7. However, the wet grinding caused a large amount of oxides or hydroxides to be present on the alloy surfaces. Consequently, the oxygen content was not fully decreased as contrasted with Examples 4–7, resulting in a reduction in life characteristics and a high rate discharge property Comparative Example 4, it is also considered that, since an electrically conductive material was added during wet grinding, the surface energy of the surfaces newly formed during grinding is lower than in the case of dry grinding, and the electrically conductive material was neither attached to the surfaces of the hydrogen absorbing alloy nor uniformly dispersed therein as contrasted with the present invention. on the other hand, the discharge capacities in cycle 200 of the batteries of Examples 4–7 are more excellent than that of the battery of Comparative Examples 4 in which a hydrogen absorbing alloy powder having a similar average particle diameter was used, but are almost equal to that of the battery of Comparative Example 5 in which a hydrogen absorbing alloy powder having a larger average particle diameter of about 35 µm was used.

From these results, it can be confirmed that, when the electrically conductive material-containing hydrogen absorbing alloy powders of the present invention are used as active materials for the negative electrodes of alkaline rechargeable batteries, they have excellent initial characteristics and a high rate discharge property and, moreover, exhibit excellent life characteristics.

What is claimed is:

1. A hydrogen absorbing alloy powder for use in the negative electrodes of alkaline rechargeable batteries which has an average particle diameter of 5 to 20 µm and an oxygen content of 2,000 to 6,000 ppm.

2. A hydrogen absorbing alloy powder for use in the negative electrodes of alkaline rechargeable batteries according to claim 1 wherein the average particle diameter is 5 to 15 µm.

3. A hydrogen absorbing alloy powder for use in the negative electrodes of alkaline rechargeable batteries according to claim 1 wherein the alloy powder further contains an electrically conductive material.

4. A hydrogen absorbing alloy powder for use in the negative electrodes of alkaline rechargeable batteries according to claim 1 wherein at least a part of the oxygen is present on the surfaces of hydrogen absorbing alloy particles in the form of hydroxyl groups.

5. A process for the production of a hydrogen absorbing alloy powder for use in the negative electrodes of alkaline rechargeable batteries which comprises the steps of grinding a hydrogen absorbing alloy in an inert gas and, prior to exposure to ambient air, treating the ground hydrogen absorbing alloy with an inert gas containing not greater than 2,000 ppm of moisture.

6. A process for the production of a hydrogen absorbing alloy powder for use in the negative electrodes of alkaline rechargeable batteries which comprises the step of grinding a hydrogen absorbing alloy in an inert gas containing not greater than 2,000 ppm of moisture.

7. A process for the production of a hydrogen absorbing alloy powder for use in the negative electrodes of alkaline rechargeable batteries according to claim 4 wherein the hydrogen absorbing alloy powder is mixed with an electrically conductive material during its grinding in an inert gas.

8. An assembly for a negative electrode in a rechargeable battery which contains the hydrogen absorbing alloy powder produced by the process comprising the steps of grinding a hydrogen absorbing alloy in an inert gas and, prior to exposure to ambient air, treating the ground hydrogen absorbing alloy -with an inert gas containing not greater than 2,000 ppm of moisture.

9. A negative electrode of an alkaline rechargeable battery which contains the hydrogen absorbing alloy powder of claim 1.

10. An alkaline rechargeable battery which has the negative electrode of claim 9.

* * * * *

UNITED STATES PATENT AND TRADEMARK OFFICE
CERTIFICATE OF CORRECTION

PATENT NO. : 6,300,010 B1
DATED : October 9, 2001
INVENTOR(S) : Hajime Nakano, Noriaki Hamaya and Satoshi Shima It is certified that error appears in the above-identified patent and that said Letters Patent is hereby corrected as shown below:

<u>Title page,</u>
Above Item [74], Primary Examiner, after "Stephen" delete "Kalaput" and replace with -- Kalafut --

<u>Column 12,</u>
Line 54 delete "-" and close space between "alloy with" as appropriate Signed and Sealed this Fourth Day of June, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,300,010 B1
DATED : October 9, 2001
INVENTOR(S) : Hajime Nakano, Noriaki Hamaya and Satoshi Shima It is certified that error appears in the above-identified patent and that said Letters Patent is hereby corrected as shown below:

<u>Title page,</u>
Item [73], Assignee should appear as follows:
-- Shin-Etsu Chemical Co., Ltd., Tokyo (JP) --

Signed and Sealed this

Fifteenth Day of October, 2002

*Attest:*

*Attesting Officer*

JAMES E. ROGAN
*Director of the United States Patent and Trademark Office*